United States Patent
Keesler

(10) Patent No.: US 7,331,561 B2
(45) Date of Patent: Feb. 19, 2008

(54) METHOD AND AN APPARATUS FOR SELECTIVELY RELEASING AIR FROM A MOLD

(76) Inventor: Ricky Keesler, 8297 W. Sargent Rd., Fowlerville, MI (US) 48836

( * ) Notice: Subject to any disclaimer, the term of this patent is extended or adjusted under 35 U.S.C. 154(b) by 247 days.

(21) Appl. No.: 10/934,806

(22) Filed: Sep. 3, 2004

(65) Prior Publication Data

US 2006/0049536 A1    Mar. 9, 2006

(51) Int. Cl.
B29C 33/46 (2006.01)
(52) U.S. Cl. .................. 249/141; 137/539; 425/812
(58) Field of Classification Search ............ 249/141; 425/812; 137/535, 539; 251/337, 339
See application file for complete search history.

(56) References Cited

U.S. PATENT DOCUMENTS

| | | | |
|---|---|---|---|
| 3,894,556 A | * | 7/1975 | Pareja .................. 137/539 |
| 4,977,927 A | * | 12/1990 | Hill ...................... 137/539 |
| 5,107,890 A | * | 4/1992 | Gute ..................... 137/539 |
| 5,324,000 A | * | 6/1994 | Peickert ................ 251/122 |
| 5,404,904 A | * | 4/1995 | Glaser .................. 137/539 |
| 6,443,421 B1 | * | 9/2002 | Wolfe .................... 251/62 |
| 6,572,799 B2 | * | 6/2003 | Radzio et al. ........ 264/40.5 |

* cited by examiner

*Primary Examiner*—Yogendra N. Gupta
*Assistant Examiner*—Dimple N. Bodawala
(74) *Attorney, Agent, or Firm*—Law Offices of John Chupa & and Associates, PC

(57) ABSTRACT

A method and an apparatus 10 for selectively venting air 98 from the internal cavity 94 of a mold 90. Particularly, the apparatus 90 includes a body 12 having a selectively movable member 30 whose position within the body 12 determines whether the air 98 is vented from the mold 98. After the air 98 is vented,. The member 30 returns to a normal position in which communication between the internal cavity 94 of the mold 90 and the ambient environment 100 is foreclosed.

4 Claims, 2 Drawing Sheets

US 7,331,561 B2

METHOD AND AN APPARATUS FOR SELECTIVELY RELEASING AIR FROM A MOLD

FIELD OF THE INVENTION

The present invention generally relates to a method and an apparatus for selectively releasing air from a mold and more particularly, to a method and an apparatus for efficiently, selectively, and cleanly releasing air from a mold or other container and which substantially prevents an undesired release of such air from the mold or other container.

BACKGROUND OF THE INVENTION

A mold is used to selectively create an item of manufacture, such as and without limitation, a vehicular seat. One form of mold is adapted to receive a certain amount of material, such as foam, and to allow the form to selectively expand, within the mold, thereby forming the article of manufacture having a certain size and shape. In the process of expanding, the foam forces the air, which is present within the mold, away from it.

While these molds do allow for the selective formation of an article of manufacture, they have some drawbacks. By way of example and without limitation, they do not reliably allow the air to be emitted, thereby causing the air to be undesirably mixed with the expanding foam and causing an article of manufacture or product to be formed having undesired physical characteristics. Further, while some molds do allow the air to be selectively emitted away from the expanding foam, the emission apparatus frequently receives some of the expanding foam and becomes "dirty" or "plugged". This situation substantially prevents the apparatus from optimally functioning and further reduces the amount of air which is emitted from the mold or even, in some situations, prevents such air from being emitted.

There is therefore a need for a new and improved method and apparatus for selectively releasing and/or emitting air from a mold which overcomes the various previously delineated drawbacks which are set forth above and the present inventions provide such benefits in a new and novel fashion.

SUMMARY OF THE INVENTION

It is a first non-limiting object of the present invention to provide a method and an apparatus for selectively releasing air from a mold which overcomes some or all of the previously delineated drawbacks of prior arrangements.

It is a second non-limiting object of the present invention to provide a method and an apparatus for selectively releasing air from a mold which overcomes some or all of the previously delineated drawbacks of prior arrangements and which, by way of example and without limitation, releases the air in an efficient and substantially clean manner.

It is a third non-limiting embodiment of the present invention to provide a method and an apparatus for selectively releasing air from a mold which overcomes some or all of the previously delineated drawbacks of prior arrangements and which, by way of example and without limitation, includes a movable member whose position determines whether such air is released from the mold.

According to a first non-limiting aspect of the present invention, an apparatus is provided and includes a generally hollow body having a first outlet portion and a second threaded inlet portion; an element which is movably disposed within the generally hollow body; and a top having a threaded portion which is adapted to be selectively coupled to the second threaded inlet portion, the top further having a outwardly protruding spring which engages the movable element when the threaded portion of the top is selectively coupled to the threaded portion of the second inlet portion.

According to a second non-limiting aspect of the present invention, an apparatus for selectively and cleanly removing air from a mold is provided. Particularly, the apparatus includes a generally cylindrical and hollow body having a longitudinal axis of symmetry and opposed orifices which are positioned along the longitudinal axis of symmetry, the body having a threaded portion which circumscribes a first of the pair of orifices; a ball which movably resides within the generally cylindrical and hollow body and upon the longitudinal axis of symmetry; and a top portion having threads which are adapted to be selectively and removably coupled to the threaded portion of the body, the top further having an outwardly protruding spring which is positioned within the generally hollow body along the longitudinal axis of symmetry, and in contact with the ball when the top portion is attached to the body, wherein a second of the pair of orifices is adapted to selectively receive the air from the mold and communicate the received air to the ball which causes the ball to move against the spring and allow the received air to pass through the generally hollow body and to be outputted from the second of the pair of orifices and wherein the spring, in the absence of the received air, pushes the ball against the first of the pair of orifices, thereby closing the first of the pair of orifices.

According to a third non-limiting aspect of the present invention, a method for selectively releasing air from a mold is provided. Particularly, the method includes the steps of receiving the air; providing an outlet from the mold; causing the received air to freely travel a certain and substantial distance within the apparatus before impacting any portion of the apparatus; and thereafter causing the received air to enter the outlet.

These and other features, aspects, and advantages of the present inventions will become apparent from a consideration of the following detailed description of the preferred embodiment of the invention, by reference to the subjoined claims, and by reference to the attached drawings.

DETAILED DESCRIPTION OF THE PREFERRED EMBODIMENT OF THE INVENTION

Figure 1:
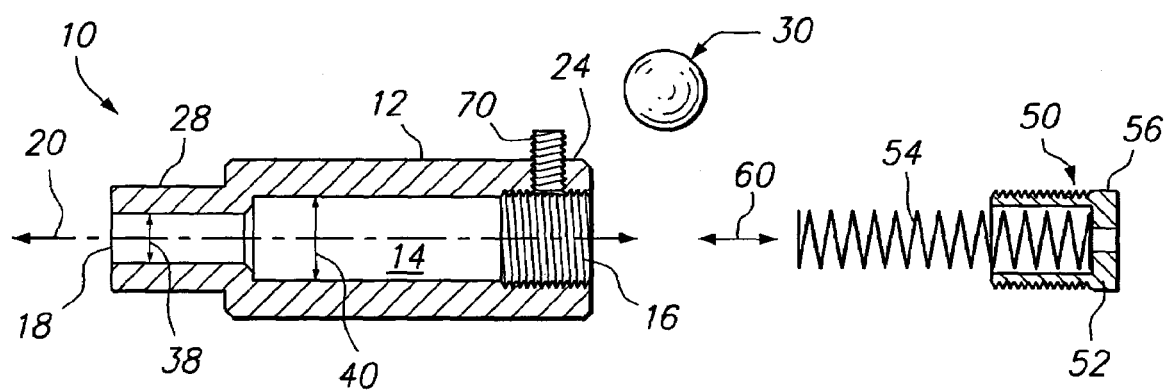
FIG. 1 is an unassembled side sectional view of an apparatus which is made in accordance with the teachings of the preferred embodiment of the invention.
Figure 2:
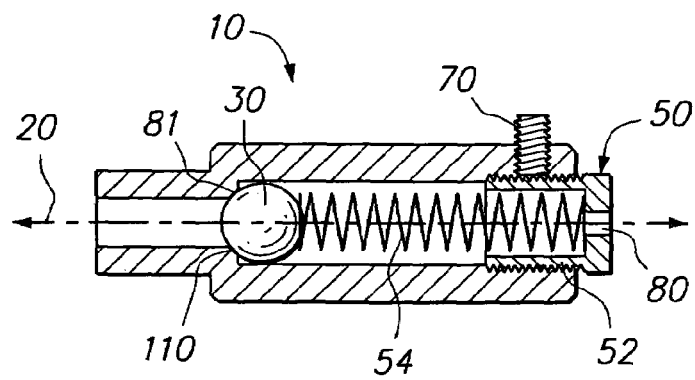
FIG. 2 is a side sectional assembled view of an apparatus which is made in accordance with the teachings of the preferred embodiment of the invention.
Figure 3:
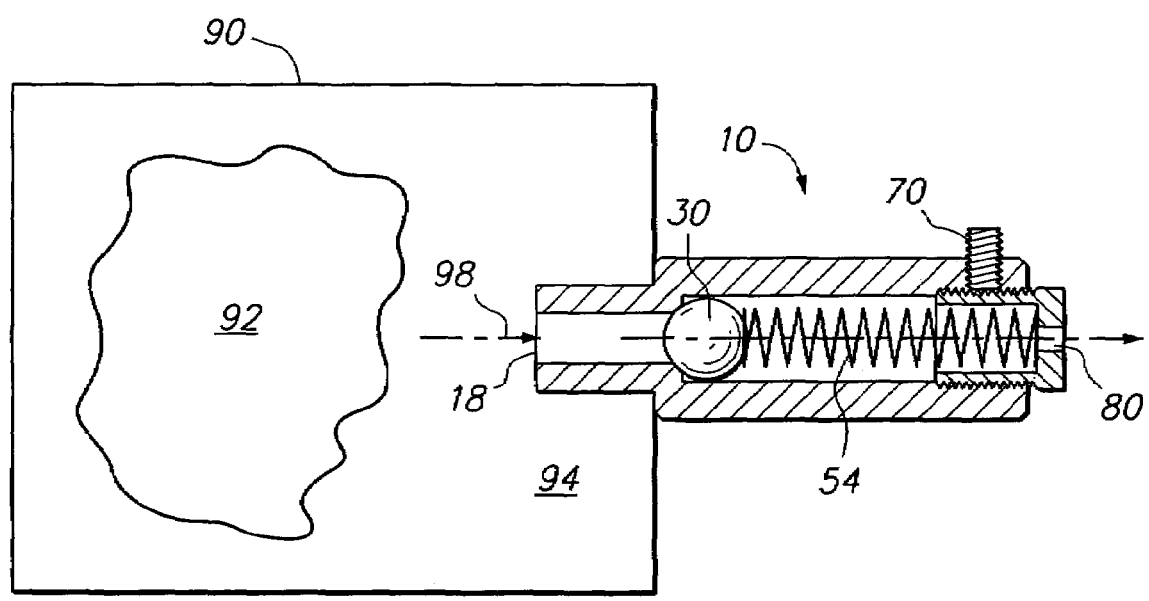
FIG. 3 is a side sectional assembled view of an apparatus which is made in accordance with the teachings of the preferred embodiment of the invention operably deployed within a typical mold.

Referring now to FIGS. 1-3, there is shown an apparatus 10 which is made in accordance with the teachings of the preferred embodiment of the invention.

Particularly, as shown, the apparatus 10 includes a generally hollow and elongated body 12 having an internal cavity 14. The body 2 includes opposed orifices 16, 18 which are substantially aligned along the longitudinal axis of symmetry 20 of the generally hollow and elongated body 12. In one non-limiting embodiment of the invention, the body 12 has a generally cylindrical cross sectional area, although other types of cross sectional areas may be utilized. The body 12 further includes an internally threaded portion 24 (i.e., the threads reside within the cavity 14) which substantially circumscribes the orifice 16 and a neck portion 28 into which the orifice 18 is formed. The neck portion 28 has a diameter 38 which is substantially smaller than the diameter 40 of the internal cavity 14.

The apparatus 10 further includes a movable element 30, such as and without limitation a ball, which is adapted to be movably disposed within the cavity 14 (i.e., is adapted to move only within the portion of the internal cavity 14 having the diameter 40. It should be appreciated that the element 30 may have any substantially desired shape and size as long as it is movable within the cavity 14 of the apparatus 10 and that nothing in this description is meant to limit the movable element 30 to a ball or any other specific shape.

As is further shown in FIGS. 1-3, the apparatus 10 includes a top portion 50 having an externally threaded portion 52 which is complementary to threaded portion 24 and an outwardly protruding spring portion 54 which is, in one non-limiting embodiment of the invention, orthogonally coupled to the base portion 56 of the top 50 (i.e., the spring portion 54 lies along an axis 60 which forms a right angle with the base portion 56. The apparatus 10 further includes a set screw 70 which is movably positioned within the portion 12 proximate to the threaded portion 24 and which, as should be apparent to those of ordinary skill in the art, may be selectively moved within the interior of the portion 12 by a desired amount.

To utilize the apparatus, as best shown in FIGS. 2 and 3, the movable element or ball 30 is placed within the cavity 14 and abuts the shoulder 81 into which the neck portion 28 terminates. The top portion 50 is then placed within the apparatus 10. That is, the spring portion 54 is placed within the interior cavity 14 and is substantially aligned along the longitudinal axis of symmetry 20. The threaded portion 52 is selectively and removably coupled to the threaded portion 24 until the threaded portion 52 is engaged by set screw 70. The threaded portion 52 includes an orifice 80 which is then substantially aligned along the longitudinal axis of symmetry 20 and which is in communication with the interior cavity 14 and the orifice 18. The use of the apparatus 10 is shown, by way of example and without limitation, in FIG. 3. The use of the apparatus 10 within a mold will now be further delineated below.

Referring now to FIG. 3, there is shown a conventional mold 90 of the type which receives a certain amount of material 92 (e.g., foam) which selectively expands within the mold 90 to form a desired article of manufacture, such as vehicular seat. It should be appreciated that nothing in this description is meant to limit the applicability of the present inventions to a particular type of mold or to a particular type of manufacture and that the mold 90 is presented within this description for illustration purposes only.

Particularly, the apparatus 10 is assembled and the neck portion 28 is inserted into the internal cavity 94 of the mold 90 which receives the material 92. As the material 92 expands within the internal cavity 94, air 98 is forced away from the expanding material 92 and enters the orifice 18. The received air 98 traverse a substantial distance within the neck 28 before contacting the member 30 and thereafter forcing the member 30 to move in the direction of and against the spring 54, thereby compressing the spring. The air 98 then traverses through the cavity 14 and through the generally hollow top member 50, before exiting the apparatus 10 through the orifice 80. In this manner, air 98 is selectively released from the internal cavity 94 of the mold 90. When the air 98 has been fully released from the mold 90, the spring 54 automatically (i.e., without human intervention) and forcibly returns the member 30 to a position in which the member 30 contacts the wall 81 and substantially closes the orifice 18, thereby substantially preventing contaminants or other materials from entering the internal cavity 94 of the mold 90. In this manner, communication between the ambient environment and the internal cavity 94 of the mold 90 is foreclosed.

It should be appreciated that the amount or force of air 98 needed to move the member 30 away from the shoulder 80 is dependent upon the spring constant of the spring 54 and the position of the set screw 70 (i.e., the farther within the body 12 that the top portion 50 is placed within, the tighter the compression of the spring 54 becomes against the member 30 and the more force is needed to move the member 30). In this manner, one may effectively regulate the time, during the material expansion process, in which air 98 is removed from the cavity 94 and the time in the material expansion process in which the member 30 is moved back into an orifice blocking position.

It should be appreciated that in the most preferred embodiment of the invention, the neck portion 28 has a substantially long length (about at least one sixth to about at least to about one quarter of the length of the portion 12) and that this substantially long length allows the apparatus 10 to vent or selectively release the air 98 from the mold 90 in a substantially clean manner. That is, the likelihood that the selectively expanding material 92 will actually contact the member 30 and prevent the member 30 from selectively moving within the cavity 14 is substantially reduce or substantially eliminated. In one non-limiting embodiment of the invention, the length of the neck portion 28 is about 0.75 inches and the length of the remaining part of the portion 12 is about 2.25 inches. In one non-limiting embodiment of the invention, the angle 110 (formed by the portion of the neck 81 which contacts member 30) is about 66 degrees and the diameter of orifice 18 is about 0.75 inches and the diameter of the orifice 80 is about 1 inch. Further, in one non-limiting embodiment of the invention, the spring 54 has a diameter of about ⅜ of an inch and a length of about 1.5 inches. Other dimensions may, of course, be utilized in other embodiments of the invention. Further, in one non-limiting embodiment of the invention, the apparatus 10 could be constructed from aluminum, steel, or some other conventional material, including, but not limited to, composite type materials.

It is to be understood that the inventions are not limited to their exact construction and/or methodology which has been disclosed above, but that various changes and modifications may be made without departing from the spirit and the scope of these inventions as they are defined within the following claims.

The invention claimed is:

1. An apparatus for selectively and cleanly removing air from a mold, said apparatus comprising a generally cylindrical and hollow body having a longitudinal axis of symmetry and opposed orifices which are positioned along said longitudinal axis of symmetry, said body having a threaded portion which circumscribes a first orifice; a ball which movably resides within said generally cylindrical and hollow body and upon said longitudinal axis of symmetry; and a top portion having threads which are adapted to be selectively and removably coupled to said threaded portion of said body, thereby allowing said top portion to be selectively moved from a first position in which said top portion is connected to said body to a second position in which said top portion is removed from said body just by turning said threads of said top portion within said threaded portion of said body, thereby allowing said top portion to be selectively and removably attached to said hollow body, wherein said top portion further having an outwardly protruding spring which is positioned within said generally hollow body along said longitudinal axis of symmetry and in contact with said ball when said top portion is attached to said body, wherein a second orifice is adapted to selectively receive said air from said mold and communicate said received air to said ball which causes said ball to move against said spring and allow said received air to pass through said generally hollow body and to be outputted from said second orifice and wherein said spring, in the absence of said received air, pushes said ball against said second orifice, thereby closing said second orifice; and wherein said apparatus further includes a set screw which is movably disposed within said hollow body and constrained to move only along an axis which is perpendicular to said longitudinal axis of symmetry and which is movable from a first portion which is remote from said spring which is contained within said body, to a second position in which said set screw engages said top portion, and wherein said top portion compresses said spring by a selected and desired amount, thereby selectively compressing said spring against said ball when said spring is positioned within said generally hollow body, and wherein said amount of said compression of said spring is directly proportional to the amount of force needed to be exerted by said ball against said spring to allow air to be outputted from said body.

2. The apparatus of claim 1 wherein said generally hollow body forms a neck which includes said second orifice.

3. The apparatus of claim 2 wherein said generally hollow body has a generally cylindrical cross sectional area.

4. The apparatus of claim 2 wherein length of said neck is about one quarter of length of the body.

\* \* \* \* \*